(12) United States Patent
Magens et al.

(10) Patent No.: US 10,315,843 B2
(45) Date of Patent: Jun. 11, 2019

(54) AUTONOMOUS ORDER PICKER

(71) Applicant: JUNGHEINRICH AKTIENGESELLSCHAFT, Hamburg (DE)

(72) Inventors: Ernst-Peter Magens, Ammersbek (DE); Kai Beckhaus, Freising (DE); Stefan Seemüller, Unterschleißheim (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/293,778

(22) Filed: Oct. 14, 2016

(65) Prior Publication Data
US 2017/0107055 A1    Apr. 20, 2017

(30) Foreign Application Priority Data
Oct. 15, 2015    (DE) .................. 10 2015 220 091

(51) Int. Cl.
*B65G 1/04*    (2006.01)
*B66F 9/14*    (2006.01)
(Continued)

(52) U.S. Cl.
CPC ............ *B65G 1/0492* (2013.01); *B25J 5/007* (2013.01); *B25J 19/023* (2013.01);
(Continued)

(58) Field of Classification Search
CPC ............................ B65G 1/0492; B66F 9/145
See application file for complete search history.

(56) References Cited

U.S. PATENT DOCUMENTS 3,701,446 A * 10/1972 Smith, Jr. ............... B66F 9/147
                                                        414/670
3,841,503 A * 10/1974 Hollenbach ............... B66F 9/07
                                                        414/541
(Continued)

FOREIGN PATENT DOCUMENTS

DE    3417736 A1    11/1985
DE    3808594 A1     9/1989
(Continued)

OTHER PUBLICATIONS

Search Report (with English translation) issued in German Patent Application No. 10 2015 220 091.4, 16 pages (dated Oct. 10, 2016).

*Primary Examiner* — Thomas Randazzo
(74) *Attorney, Agent, or Firm* — Rothwell, Figg, Ernst & Manbeck P.C.

(57) ABSTRACT

The order picker (1) comprising a vehicle (2, 25, 30); a robot device (3) on the vehicle (2, 25, 30), which is configured to manipulate objects within a working range (R_R); a pick-up device (4) on the vehicle for picking up a selection pallet (21) within the working range (R_R); a carrying device (5) on the vehicle for carrying an order pallet (16) within the working range (R_R); and a control unit, which is configured to activate the robot device (3) to convey load units (59) from a selection pallet (21) positioned in the working range (R_R) onto an order pallet (16) carried in the working range (R_R). The invention furthermore relates to a corresponding method for order picking an order pallet (16) comprising load units (59) from a goods warehouse having selection pallets (20) arranged in rows and/or racks (23) using a vehicle (2, 25, 30) and a robot device (3) arranged thereon having a working range (R_R).

21 Claims, 10 Drawing Sheets

(51) Int. Cl.
  *B66F 9/10* (2006.01)
  *B65G 1/137* (2006.01)
  *B66F 9/06* (2006.01)
  *B66F 9/12* (2006.01)
  *G05D 1/02* (2006.01)
  *B25J 5/00* (2006.01)
  *B25J 19/02* (2006.01)
  *B66F 9/07* (2006.01)
  *B66F 9/18* (2006.01)

(52) U.S. Cl.
  CPC ......... *B65G 1/1373* (2013.01); *B65G 1/1375* (2013.01); *B66F 9/063* (2013.01); *B66F 9/07* (2013.01); *B66F 9/10* (2013.01); *B66F 9/12* (2013.01); *B66F 9/122* (2013.01); *B66F 9/145* (2013.01); *B66F 9/147* (2013.01); *B66F 9/18* (2013.01); *G05D 1/021* (2013.01); *G05D 2201/0216* (2013.01); *Y10S 901/01* (2013.01)

(56) References Cited

U.S. PATENT DOCUMENTS

| | | | |
|---|---|---|---|
| 4,678,390 A | 7/1987 | Bonneton et al. | |
| 4,998,858 A * | 3/1991 | Magens | B66F 9/10 414/282 |
| 5,011,363 A * | 4/1991 | Conley, III | B66F 9/10 180/315 |
| 6,602,037 B2 * | 8/2003 | Winkler | B65G 1/023 414/273 |
| 7,735,586 B2 * | 6/2010 | Hammerl | B66F 9/07563 180/19.1 |
| 7,988,406 B2 * | 8/2011 | Schafer | B65G 1/1378 414/286 |
| 8,366,371 B2 * | 2/2013 | Maniscalco | H01M 2/1077 104/34 |
| 9,120,622 B1 * | 9/2015 | Elazary | B66F 9/07 |
| 9,205,979 B2 * | 12/2015 | Steinbach | B65G 1/0421 |
| 9,623,562 B1 * | 4/2017 | Watts | B25J 9/1689 |
| 2008/0267759 A1 * | 10/2008 | Morency | B65G 1/1378 414/788.8 |
| 2014/0056672 A1 * | 2/2014 | Mathys | B65G 1/0407 414/277 |
| 2015/0032252 A1 * | 1/2015 | Galluzzo | B25J 5/007 700/218 |

FOREIGN PATENT DOCUMENTS

| | | |
|---|---|---|
| DE | 299 00 899 U1 | 1/1999 |
| DE | 10 2014 111 886 A1 | 8/2014 |

* cited by examiner

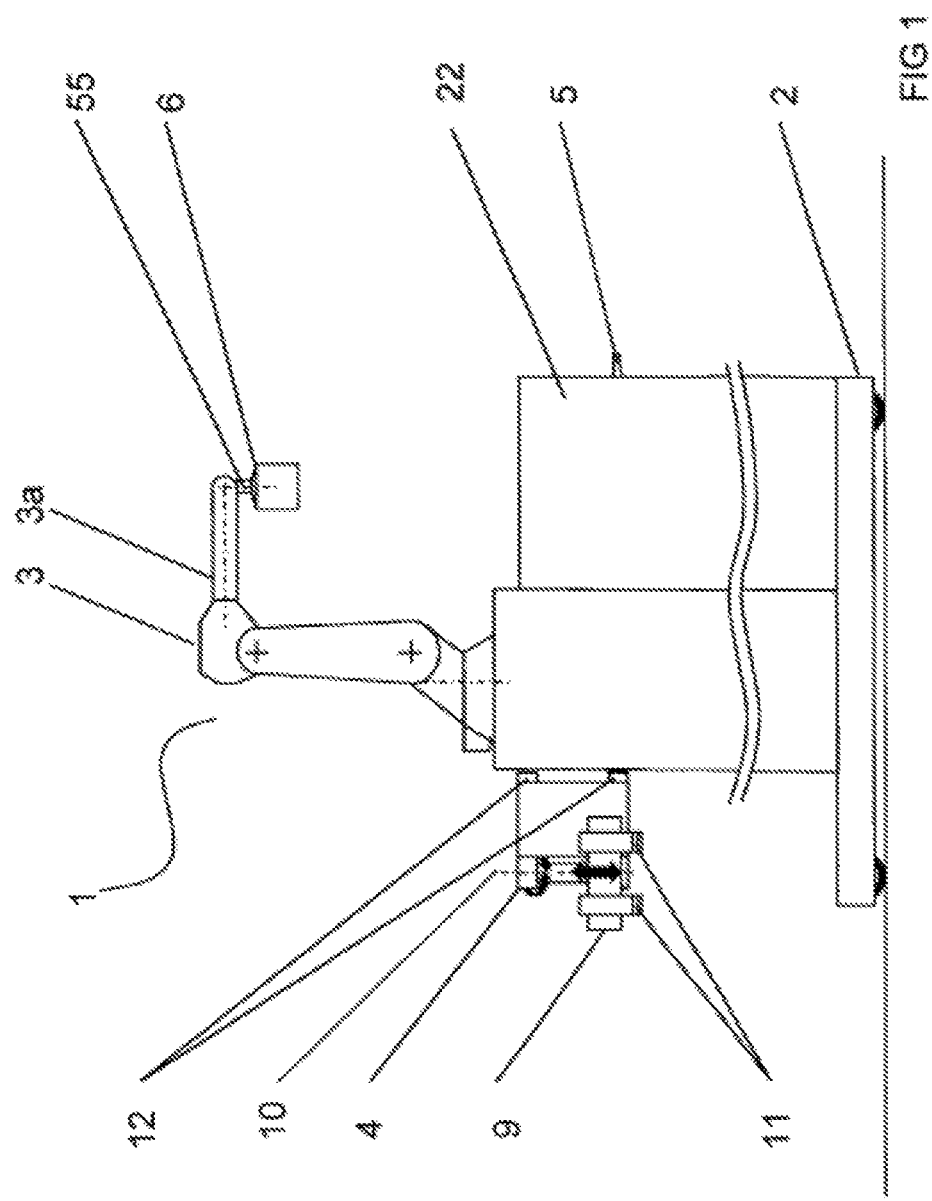

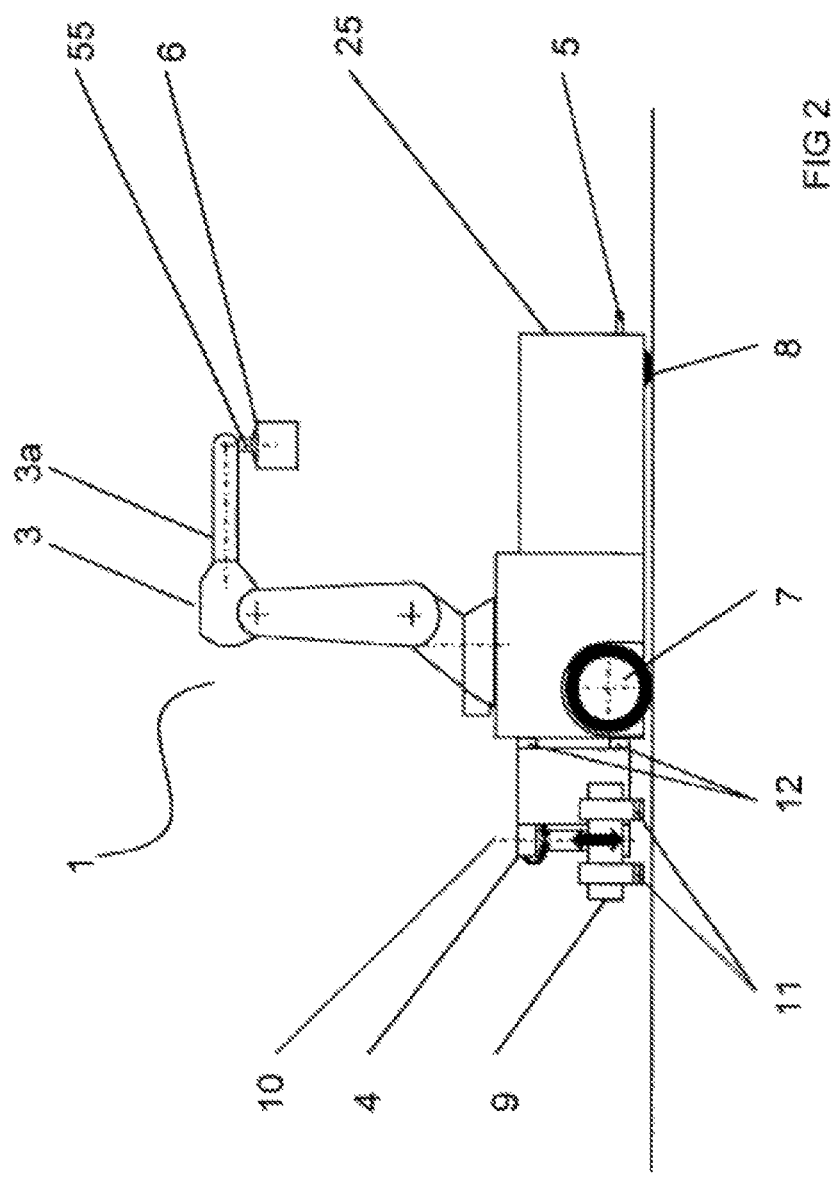

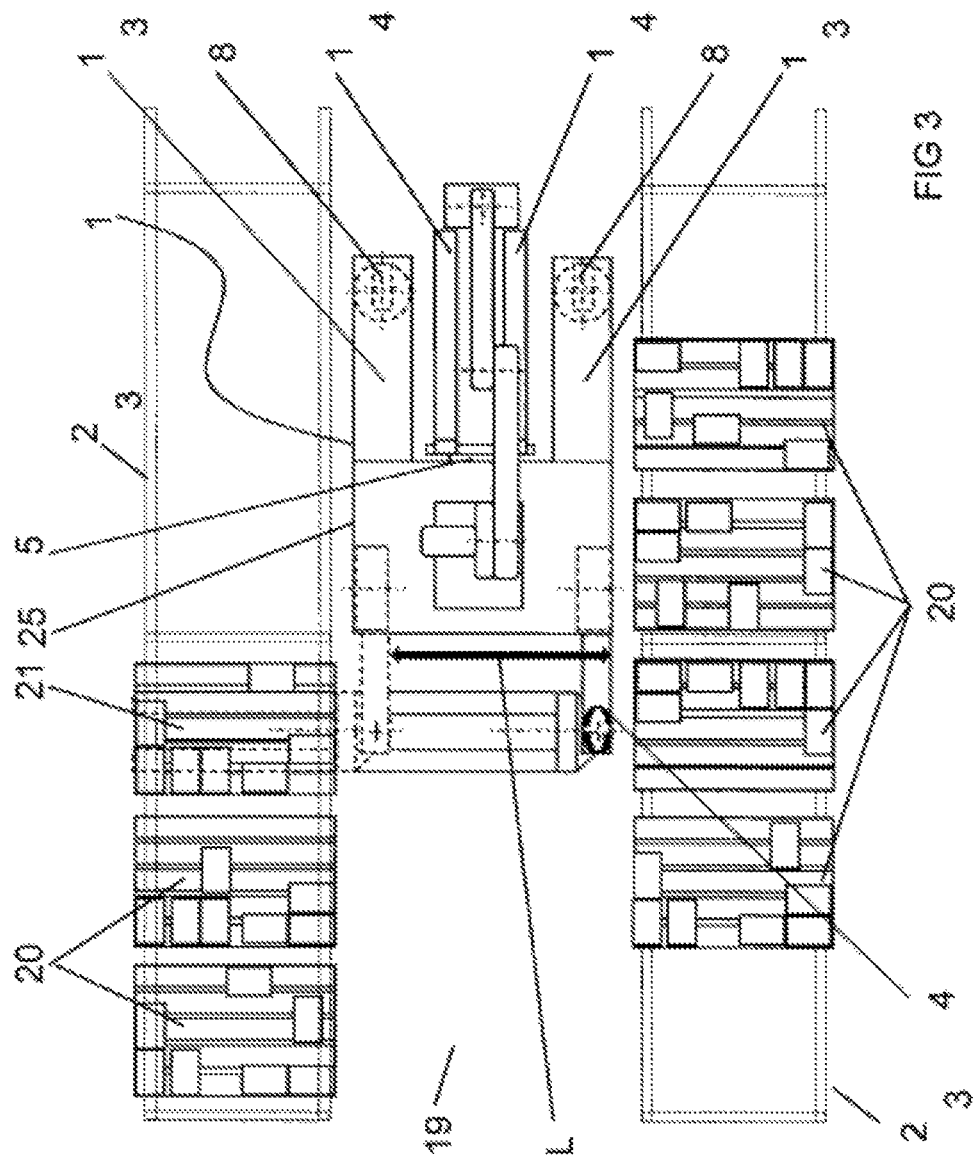

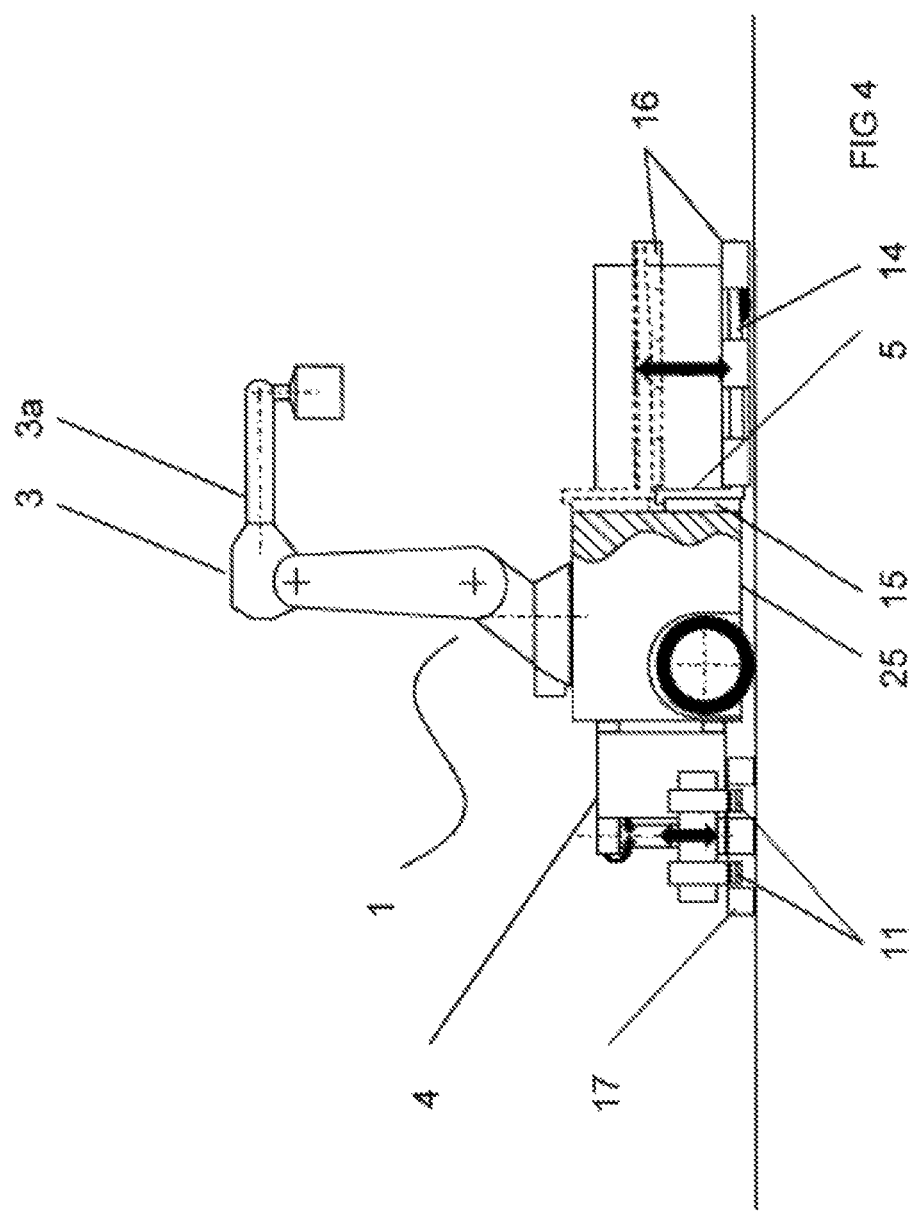

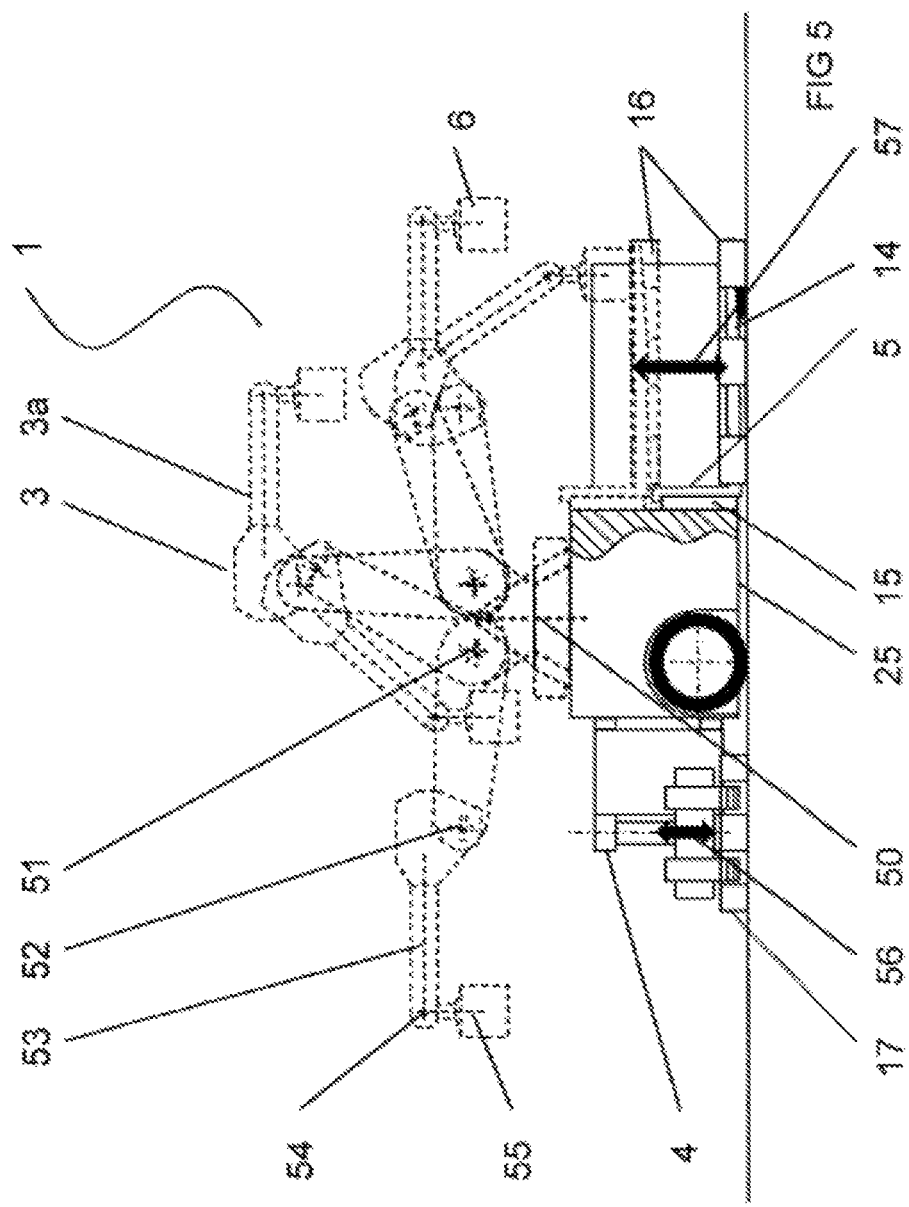

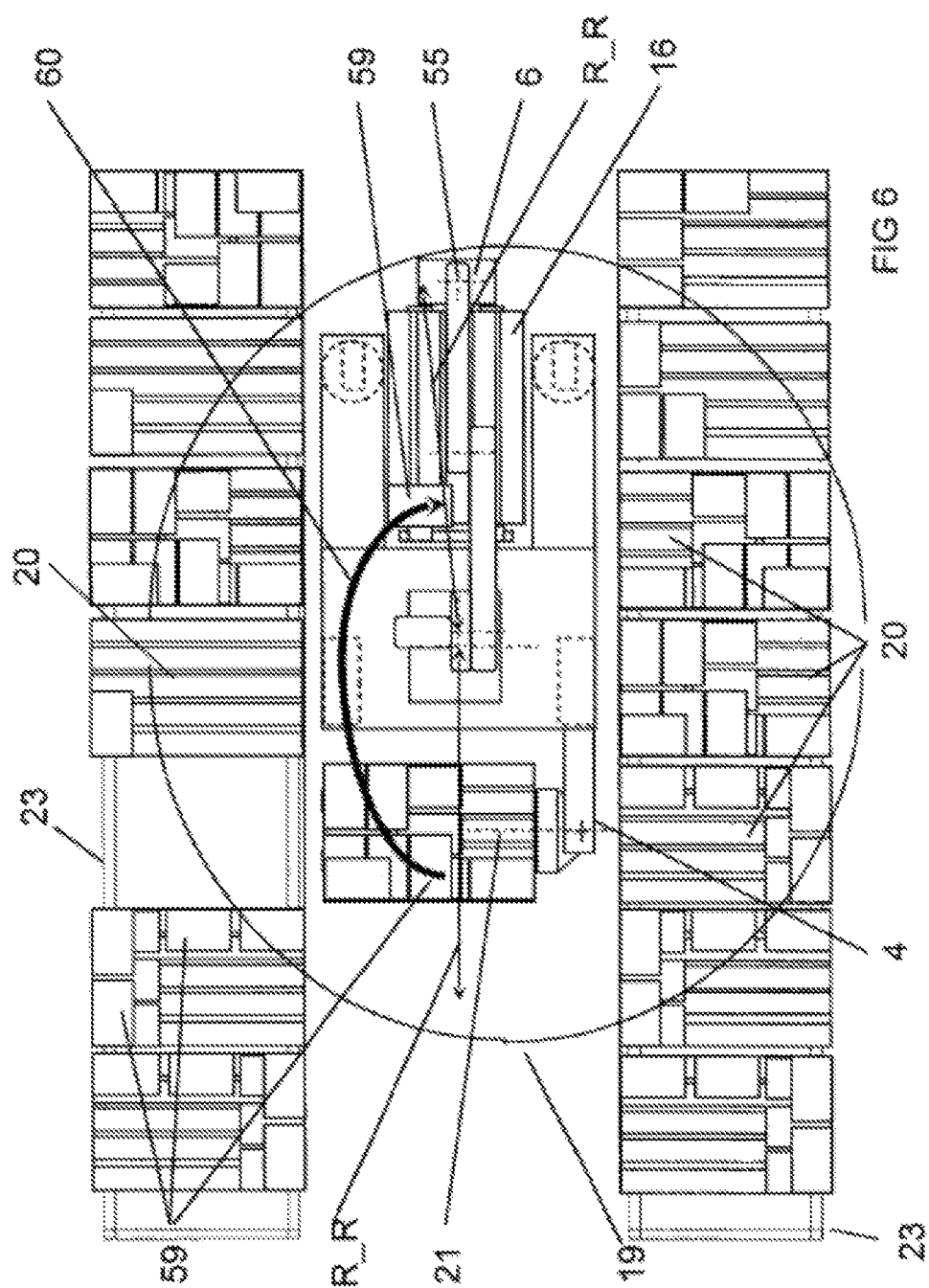

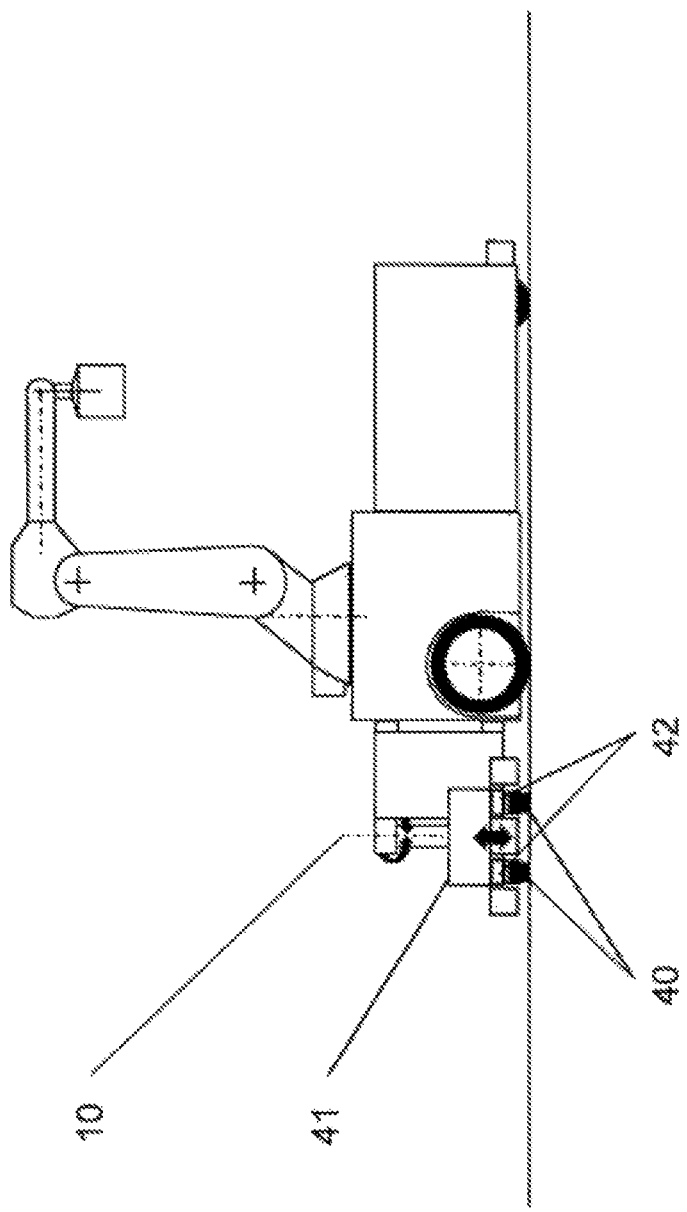

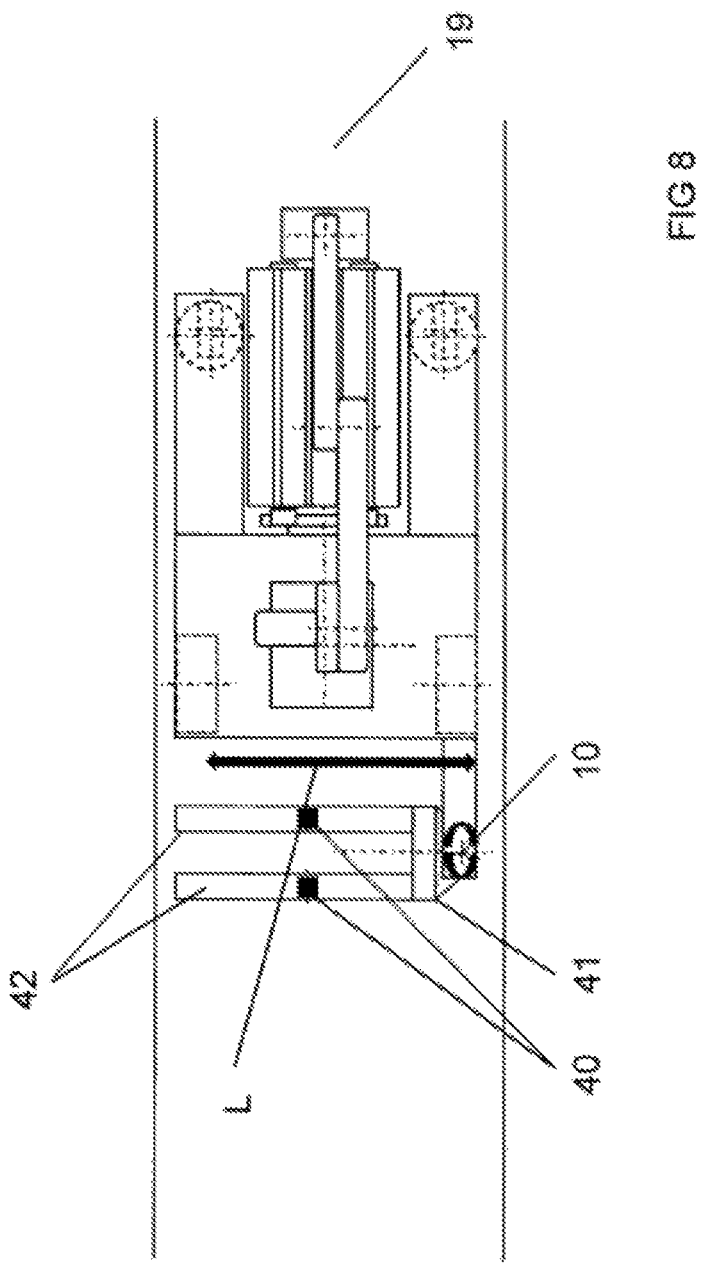

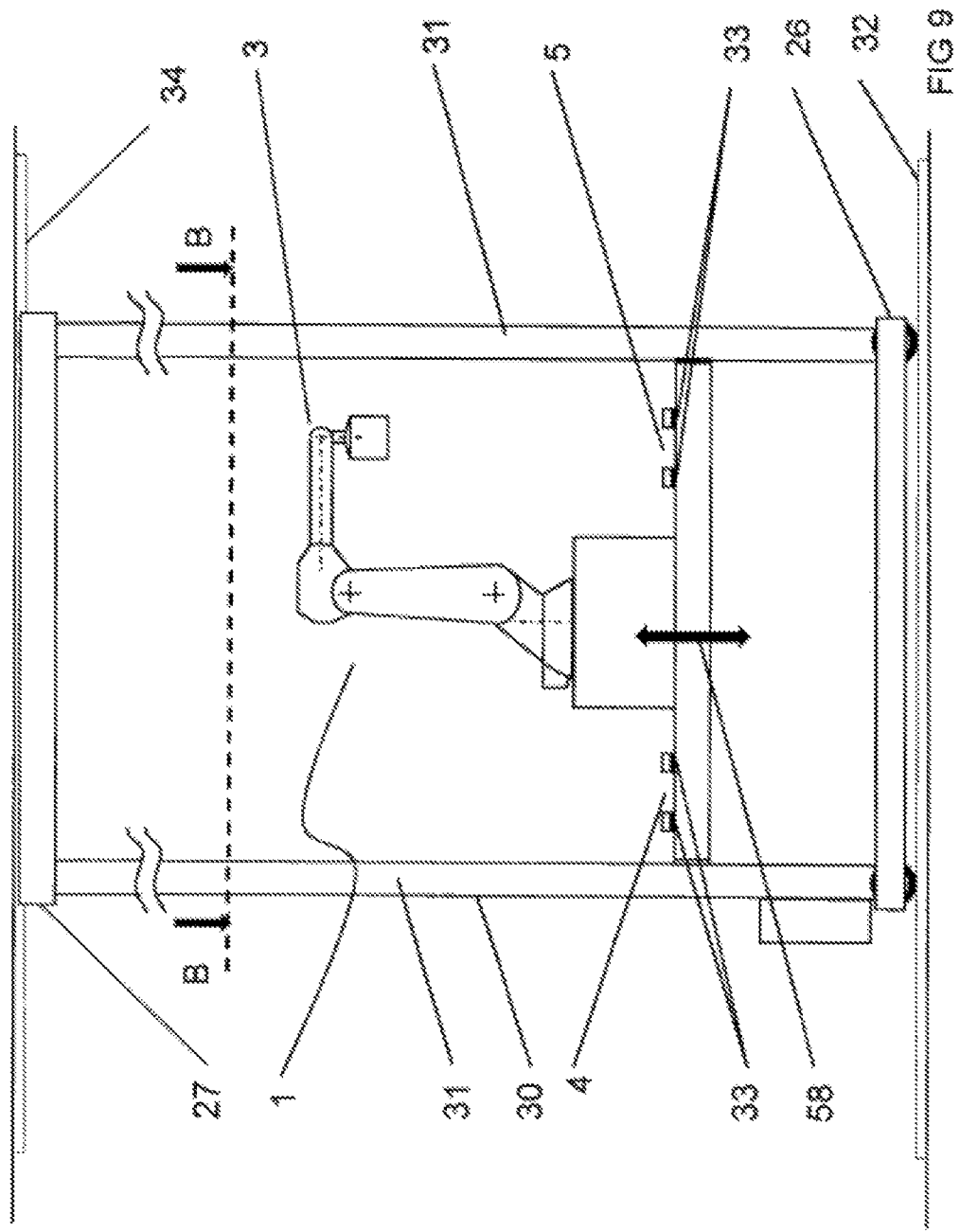

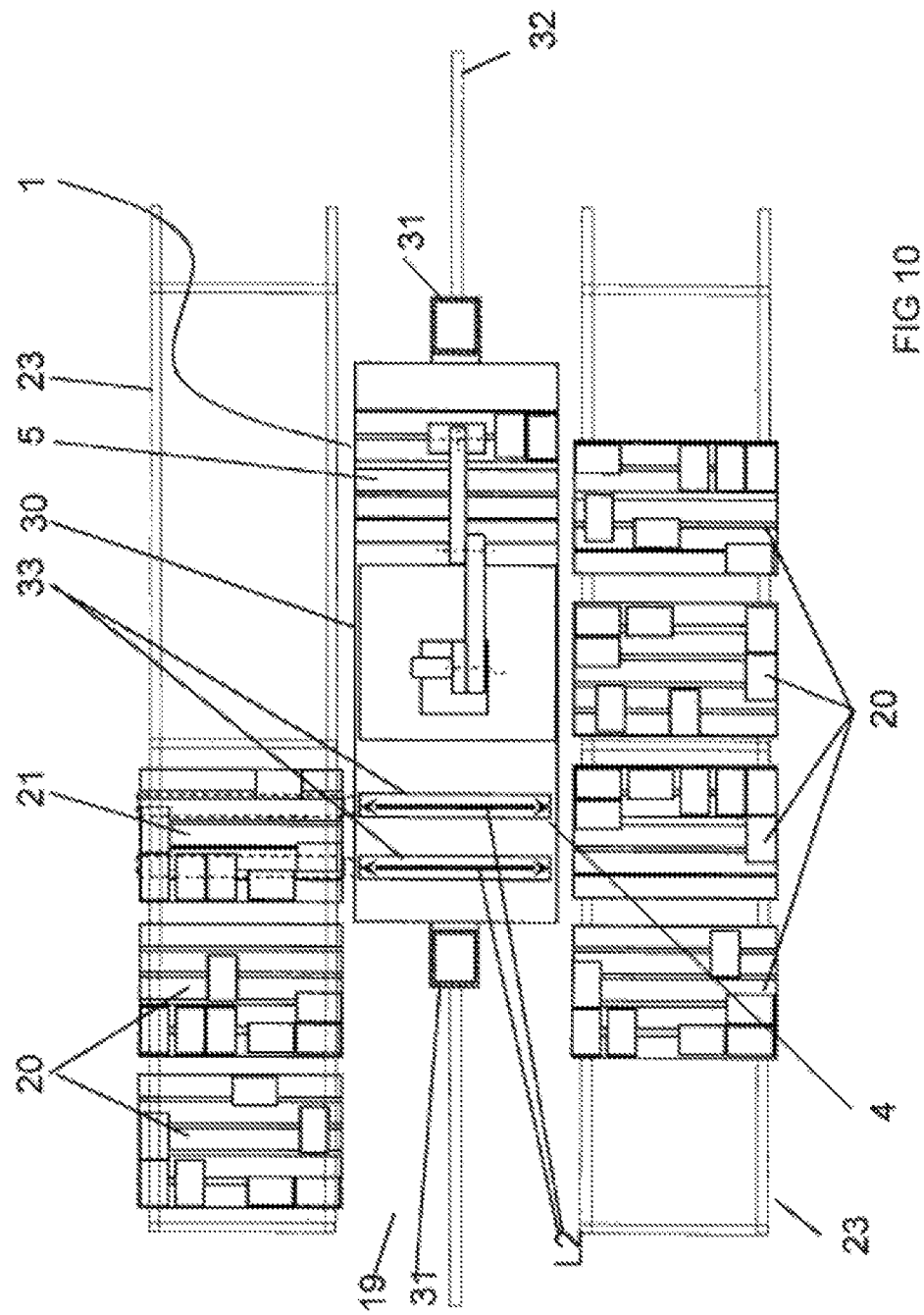

AUTONOMOUS ORDER PICKER

This application claims the benefit under 35 U.S.C. § 119 of the filing date of German patent application No. 102015220091.4 filed Oct. 15, 2015, the disclosure of which is incorporated herein by reference.

DESCRIPTION

The invention relates to an order picker and to a method for picking an order pallet.

In many cases, small goods are sold to end consumers via sales outlets having a large number of products, for example, in the case of food, in supermarkets and in discount stores. In stores of this type, it is frequently sufficient to have in store, in the sales region and in the warehouse region, quantities of specific goods which do not overall correspond to the quantity of a pallet completely filled with these goods.

At the same time, goods are most favourably delivered to the shops or sales outlets on pallets as these can easily be transported from the lorry into the warehouse.

This poses the problem that a specific sales outlet cannot generally be supplied with pallets, on which there is only one type of product or goods in each case. However, as pallets which are generally completely filled with one type of goods or product are supplied by the producer, pallets for the sales outlets have to be assembled or picked having a corresponding combination of specific part quantities of specific products required by the outlet in central warehouses, in which the pallets of the producers loaded with one type of goods are delivered and stored.

This order picking previously took place manually. For this purpose, the pallets provided by the producer comprising only one type of goods or unmixed selection pallets are provided in a warehouse. This can take place both at ground level and in the form of racks. The employee tasked with the picking drives a vehicle, in general a low-platform truck, which he has previously loaded with an empty pallet or order pallet, along these selection pallets until he reaches a selection pallet comprising the goods required according to the order list. At this point, he positions the vehicle comprising the order pallet close to the relevant selection pallet and removes the required piece number of goods or load units by hand from the selection pallet and places them on the carried order pallet.

This process is repeated accordingly for further goods on the order list until the order list has either been completely worked through or until the current order pallet is completely loaded. The order pallet is then moved to a corresponding transfer station and a new order pallet is possibly picked up to work through the remainder of the order list.

Thus, ultimately all the goods, which are intended for the sales outlets and cannot be delivered in the form of pallets filled with only one type of goods as a result of the high demand in the outlet, are manually restacked from the selection pallets onto the order pallets. This is extremely labour-intensive and therefore inefficient and can at the same time cause substantial physical strain and, depending on the type of goods and workload, may also constitute a substantial strain on the health of the employees.

Assistance systems for assisting the employees were hitherto only available to avoid errors during the picking process, in other words to avoid the picking of incorrect goods or incorrect quantities of goods (pick by light, pick by voice). Assistance systems for physical strain relief are only inadequately available as they also frequently simultaneously hinder the employees.

This most frequently used method for picking is also called static picking according to the principle of "person to goods".

Alternatively, there is also dynamic picking according to the principle "goods to person". In this case, the employee has a fixed picking workstation, to which the selection pallets and order pallets are supplied by means of corresponding conveying devices at an ergonomic height. The goods are, however, in turn removed manually by the employee from the selection pallets according to the order list and placed on the order pallets. The corresponding selection pallet is then returned to the warehouse by means of the conveying devices.

Although this method relieves the burden on the employee, as the manual restacking of the load units takes place under improved ergonomic conditions, on the other hand, substantially more material is moved to retrieve the selection pallet from the warehouse in each case, to transport it to the picking site and then to store it again in the warehouse. This may even constitute a significant waste of energy if a full selection pallet is supplied for picking in order to only remove a single load unit from the selection pallet. In addition, the conveying devices for supplying and removing the selection pallets from/to the warehouse and the corresponding conveying devices for supplying and removing the order pallets have to be accommodated at the workstation.

As in this principle "goods to person", each selection pallet is automatically returned to the warehouse, a corresponding contour control has to be carried out by the employee after the removal of a load unit, so that other load units that are on the pallet and have slipped out of position owing to the picking process do not increase the contour of the selection pallet too much as blockages could occur as a result during the automatic storage and retrieval of the selection pallets. Generally this is implemented at a gate provided with laser sensors. Thus, when the selection pallet passes, the sensors can control whether overhangs, loose films or the like are present and an alarm can be raised correspondingly or a separate process can be introduced.

There has been no success to date in using robots instead of employees to remove the load units and for loading onto the order pallet for various reasons. This is because people, on the one hand, using their hands, have very universal gripping tools and, on the other hand, by means of their eyes and cognitive abilities, have excellent image evaluation. Consequently, employees can frequently identify the load units much more efficiently than robots and load them suitably onto the order pallet.

Robots can virtually only be used if a corresponding free space is available above the selection pallet so that a robot can detect the load unit to be picked with respect to its position and geometry and can move it using corresponding means. This requirement for free space is in contradiction with the requirement in the picking warehouse for achieving as high a packing density as possible in the warehouse for reasons of economy.

The invention is therefore based on the object of providing an order picker, which, on the one hand, can carry out the picking process without an operator and, on the other hand, does not require a large free space above the selection pallet stored in the warehouse. Likewise a corresponding method is to be provided.

This object is achieved according to the invention by an order picker according to claim 1 and by an order picking method according to claim 20. The order picker according to the invention comprises a vehicle; a robot device on the vehicle, which is configured to manipulate objects within a working range; a pick-up device on the vehicle for picking up a selection pallet within the working range; a carrying device on the vehicle for carrying an order pallet within the working range; and a control unit, which is configured to activate the robot device to convey load units from a selection pallet positioned in the working range onto an order pallet carried in the working range.

As a result, once the order picker according to the invention in a warehouse has been brought to a selection pallet comprising corresponding load units, or has moved there, the order picker can guide the corresponding selection pallet from its warehouse position and position it in the free space available for approaching the various warehouse positions, so, in particular, a free space is provided above the selection pallet, in which the robot device can work without hindrance. Thus the robot device can identify the load unit accordingly and move it onto the carried order pallet. The selection pallet can then be placed back at its warehouse site and the order picker can accordingly move on to the next selection pallet or to the unloading or transfer site of the order pallet.

As a result, automatic picking can be achieved in a warehouse having a high packing density.

It should be pointed out here that a vehicle is, in particular, to be taken to mean all known types of vehicle conventional in the field of warehouse operation, in particular including low-platform vehicles, narrow aisle vehicles or storage and retrieval units.

The robot device is, in particular, to be taken to mean all controllable and driven slides, grippers, arms and similar mechanisms, which are suitable for moving load units. In this case, the term "robot device" includes both movable and stationary parts and the drive mechanism and optionally energy store of corresponding robots.

The term "selection pallet" is preferably taken to mean a pallet, on which only load units of one type are located, as storage usually takes place in this manner in large warehouses. However, pallets, on which a plurality or a large number of different types of load units are stored, are also to be included. Likewise, a pallet is not only to be taken to mean the Euro pallet preferably used in this sense, but every other arrangement and/or container and/or loading platform which can be used in technically the same or a similar manner for storing load units for picking. Therefore, although the term "pallet" is preferably to be taken to mean a Euro pallet within the scope of the present invention, roll containers and the like may also be intended. This applies both to the term "selection pallet" and the term "order pallet".

The control unit may be produced in any desired technical manner and in any desired position, for example as a control computer on the vehicle, which only controls this vehicle, or as a central control computer, which is arranged remote from the vehicle and, for example, controls the entire picking processes and vehicles of an entire warehouse. The control unit may also be produced by a distributed functionality, for example by a control computer on the vehicle for robot and/or vehicle functions and a superordinate central picking controller for the superordinate control of the order processing.

Accordingly, the order picker according to the invention may, in particular, also be taken to mean a system comprising a plurality of corresponding vehicles and a central control unit or a plurality of control units cooperating with one another.

In particular, by the use of the term "a", it is also to be understood that the relevant order picker may comprise a corresponding aspect and further similar aspects such as, for example, an order picking system according to the invention comprising one and further similar vehicles, which are controlled by a control unit.

The pick-up device is preferably configured to remove a selection pallet from a rack and, in particular, from a high rack and in general from conventional warehouse regions. As a result, order pickers according to the invention can be used without problems in conventional warehouses.

The order picker according to the invention preferably furthermore comprises a camera, which is preferably arranged on the robot device. In this case, the control unit is configured to control the conveying of load units using recordings, produced by the at least one camera, of a carried order pallet and a selection pallet that has been picked up. For this purpose, the control unit will in general activate the camera and/or the robot device in such a way that recordings that are as complete as possible, above all of the upper side of the order pallet and the selection pallet, are produced and then a corresponding image processing and object identification is carried out by the control unit configured for this purpose, and so the positions of the various load units on the order pallet and the selection pallet are then correspondingly known. Thus, the robot device can be precisely activated to correspondingly move load units from the selection pallet onto the order pallet.

In a further preferred embodiment, the control unit may also be configured to activate the robot device to move load units from the order pallet onto the selection pallet. This is advantageous in that, to a certain extent, changes to the order can then be taken into account during the picking process and optionally incorrect pickings can also be corrected.

In a further preferred embodiment, the control unit is configured to determine, before and/or after the conveying of a load unit and using recordings produced by the at least one camera, whether, in addition to the load unit just conveyed, other load units have also changed their position on the selection pallet that has been picked up and/or on the carried order pallet. For unintentional displacements or the slipping out of position of load units, this provides the advantage of recognising a possible incorrect positioning of load units that have not deliberately been moved by the robot devices.

This provides additional safety for the fully automatic operation of the warehouse as, in particular, load units are prevented from falling down, in particular in aisles, in which vehicles have to drive. Additionally or alternatively, the control unit can be configured to determine, on the basis of corresponding recordings, whether a contour of the order pallet and/or the selection pallet meets predetermined parameters. This means, in particular, that overhangs, loose films or the like are identified. The predetermined parameters, such as, for example, maximum dimensions or shape of the selection pallet and/or the order pallet, depend on the properties of the warehouse or the pallet warehouse for the selection pallet and on the requirements of the recipients of the order pallets, such as, for example, the width of the compartments in the rack or the length and width of the load bed of the lorries that transport the order pallets away.

In a further embodiment, the robot device is set up in such a way that when conveying a load unit from a selection pallet that has been picked up to a carried order pallet, the load unit and parts of the robot device that move during the conveyance move substantially and preferably exclusively within a width of the vehicle, when viewed from an upper side of the vehicle. This provides the great advantage that the order picker is also usable in a warehouse having narrow aisles as the aisle width in any case always corresponds at least to the vehicle width or slightly more. In the ideal case, the aisle width may correspond to a selection pallet or slightly more. This, in particular, virtually excludes a collision of parts of the robot device with the racks or pallets that are stored.

In relation to the longitudinal direction of the vehicle, the robot device is preferably designed in such a way that the movement region of the load unit and the robot device is substantially or preferably limited to regions above the vehicle, the selection pallet that has been picked up and the carried order pallet. This also reduces the chance of a collision in the forward and rearward direction of the vehicle.

It should be noted that terms such as "transversely", "vehicle width", "in front of", "behind", "above", "below", "vertical" etc. relate to the vehicle in a travel position, in other words, for example, that the longitudinal direction corresponds to the direction along which the vehicle travels when travelling straight ahead or that the vehicle width is the widest extent transverse to this direction of the vehicle or the combination of the vehicle with the order pallet and selection pallet.

The robot device preferably comprises an articulated arm, in particular an articulated arm comprising at least three joints. Using one of these, the requirements of movement only above the vehicle and within the vehicle width can easily be realised and the corresponding load units can be effectively moved by providing the articulated arm with a suitable gripper.

The control unit is furthermore preferably configured to activate or steer the vehicle in particular to approach corresponding selection pallets according to a list of load units to be picked. This means, in particular, that the control unit can be configured to accordingly activate the drive and steering of the vehicle on the basis of an order list and an inventory plan of the warehouse so that said control unit consecutively activates the required positions to pick up the corresponding selection pallets. In this case, the control device will preferably bring about a corresponding pick up of the selection pallet and a corresponding movement of the relevant load units from the selection pallet onto the order pallet upon reaching the corresponding position, in each case. If, moreover, the control device is configured to correspondingly drive a completely picked order pallet by the vehicle to the corresponding unloading and/or transfer station, completely automated picking can be achieved.

The order picker furthermore preferably comprises a guide device, on which the pick-up device is mounted so as to be linearly movable, in particular in such a way that it can be displaced transversely to the vehicle. This is advantageous as warehouses are generally constructed in the form of a plurality of parallel rows of pallets or pallet racks, so contact with a stored selection pallet can be produced relatively easily by displacing the pick-up device transversely.

The pick-up device furthermore preferably comprises a height-adjustable fork carriage that can be pivoted about a vertical axis and is intended for lifting a selection pallet. A design of this type is advantageous in that conventional Euro pallets can be lifted in a very effective manner using fork carriages and the height adjustability and rotation about the vertical axis allow pallets both to the left and right of the vehicle and pallets close to the ground and also further up to be picked up accordingly using the fork carriage.

In particular when used in conjunction with selection pallets that are stored at floor level, the fork carriage can preferably be equipped with load rollers for wheel support for the fork carriage.

The described embodiments of the pick-up device are particularly advantageous in combination with the guide device as the fork carriage is then adjusted accordingly to a suitable height, is oriented suitably by rotation to the selection pallet that is to be picked up and, by means of the guide device, the fork carriage is correspondingly moved into the pallet in order to lift it up and to move it out of the rack by actuating the guide device.

The carrying device furthermore preferably comprises a height-adjustable fork carriage to lift an order pallet.

This is advantageous in that the transfer station for empty order pallets and the transfer station for picked order pallets are frequently at ground level, and therefore the vehicle only accordingly has to activate the suitable position for picking up or delivering an order pallet and accordingly has to lift or lower the order pallet by means of the height-adjustable fork carriage.

In a further preferred embodiment, the pick-up device and/or the carrying device comprise telescopic forks, which can preferably be telescoped transversely to the vehicle and preferably on the two sides thereof. This embodiment is favourable, in particular, for a high-rack warehouse, as the corresponding vehicles, referred to as storage and retrieval units, directly comprise a lifting and lowering platform, which is moved to a corresponding level of the high-rack warehouse. A storage and retrieval unit of this type frequently runs on rails and/or wheels and specifically on the ceiling and floor. As it is therefore always in the same position with respect to the high racks and with respect to the corresponding order pallet transfer stations, complicated rotation mechanisms can be dispensed with and the pure telescopic capability towards the two sides is completely sufficient to accordingly pick up pallets or deposit them again. However, it is then, inter alia, not possible to pick up the pallets directly from the floor and to deposit them directly on the floor.

In a further embodiment, the vehicle comprises a lifting device for the height adjustment of the robot device, pick-up device and/or carrying device. This is advantageous when pallets are not only on the ground but racks having a plurality of levels are also provided in the warehouse, and so pallets must sometimes be picked up from the ground and sometimes from higher rack sites.

The vehicle may, in particular, be designed in the form of a narrow aisle vehicle for use in a ground-level or else multi-level pallet warehouse.

In a preferred embodiment, the carrying device is arranged between two wheel arms of the vehicle, in which rollers, preferably castors, are mounted. This is advantageous with regard to a compact construction, as a wide wheel position is preferred with regard to the stability and steering, while at the same time the order pallet can easily find space between the wheel arms and is positioned more stably.

In a further embodiment, preferably in combination with the previous one, the vehicle comprises drive wheels, preferably fixed drive wheels, closer to the pick-up device than to the carrying device. This is advantageous in that the drive wheels can then be arranged virtually centrally in relation to the entire vehicle and, in particular below the robot device, which is optimal with regard to the stability and reduction in the risk of tipping over due to the weight change when conveying load units, in particular to the side of the vehicle.

In particular, the pick-up device and carrying device may be provided at opposing ends of the vehicle, for example the pick-up device at the front and the carrying device at the back.

In a further preferred embodiment, the vehicle is designed as a low-platform truck for use in a warehouse having selection pallets deposited at floor level.

In a further preferred embodiment, the vehicle is designed as a storage and retrieval unit for use in a high-rack warehouse. This is advantageous in that high-rack warehouses are optimal with regard to the stored goods quantity in relation to the required floor space.

A method according to the invention for picking an order pallet from a goods warehouse having selection pallets arranged in rows and/or racks comprises the steps of:
  a) arranging the order pallet on a vehicle within the working range of a robot device arranged on the vehicle;
  b) moving the vehicle to reach a position next to a current selection pallet comprising at least one load unit currently required for picking;
  c) positioning the current selection pallet within the working range of the robot device, so that there is adequate space above the current selection pallet to operate the robot device;
  d) conveying the at least one load unit currently required for picking from the current selection pallet onto the order pallet using the robot device, continuing with step d) until all the required load units have been removed from the current selection pallet;
  e) returning the current selection pallet to the previous warehouse position; and
  f) if the picking has not yet been completed, continuing with step b), otherwise moving the vehicle to an order pallet transfer point/unloading point and transferring or unloading the order pallet.

This method according to the invention solves the problem of the use of a robot for picking goods from pallets within a warehouse. The method according to the invention can, in particular, be carried out using the order picker according to the invention.

In an advantageous manner, the method according to the invention can be developed in that before step d), step c1) is carried out, which provides:
  c1) detecting the position of the load units located on the order pallet and/or the contour of the order pallet using images recorded by a camera.

This step ensures that errors with regard to the precise loading or equipment of the order pallet are recognised and accordingly the picking is less prone to errors.

Furthermore, the method according to the invention can be improved by carrying out step c2) after step c) or c1) and before step d) or after step c) and before step c1), step c2) providing:
  c2) detecting the position of the at least one load unit currently required for picking and/or the contour of the selection pallet using images recorded by a camera.

This is advantageous in that, on the one hand, errors can be recognised and, on the other hand, precise control of the robot device is possible on the basis of the detected position. Advantageously, step d) then no longer provides that d) is to be repeated but that repetition is to take place beginning with step c1) and/or c2).

Steps c1) and c2) can be carried out in different embodiments in various orders or else repeatedly, for example firstly c2) and then c1) or firstly c1), then c2) and then c1) again.

Furthermore, the method according to the invention may also advantageously comprise after step d), step d1) before step e), step d1) providing:
  d1) detecting the position of the load units located on the order pallet and the selection pallet and/or the contour of the order pallet and the selection pallet using images recorded by a camera.

This provides the advantage that on conclusion of the removal of load units from the selection pallet a check is made again whether the loading of the selection pallet and the order pallet still corresponds to the required parameters and whether some load units have unfavourably been unintentionally displaced.

In this case, all the steps mentioned that comprise an evaluation of recordings from a camera, can be advantageously developed by adding the triggering of a disturbance and/or alarm function to the step in the case of inadmissible position and/or contour changes and/or values of the order pallet or the selection pallet. This is advantageous in that employees can react accordingly even upon relatively small disturbances and relatively great damage is avoided.

It should also be pointed out that a load unit within the scope of the invention is to be taken to mean any type of goods or pickable object, in other words, in particular, all types of pickable loads, products and/or goods.

Furthermore, it is to be noted that the term "rack" is not only to be taken to mean multi-level racks but also the arrangement of pallets on the floor in a row representing in this sense a ground level or zero-level rack.

A plurality of embodiments of the invention will be described in more detail below with reference to the drawings.

FIG. 1 is a schematic side view of an order picker according to the invention.

FIG. 2 is the schematic side view of a further order picker according to the invention.

FIG. 3 is a plan view of the order picker according to the invention according to FIG. 2 in use in a warehouse.

FIG. 4 shows the order picker according to the invention from FIG. 2 in a side view with a partial section.

FIG. 5 is the view according to FIG. 4 showing various positions of the articulated arm.

FIG. 6 is a plan view according to FIG. 4 showing a selection pallet that has been picked up.

FIG. 7 is a schematic side view of a further embodiment of the order picker according to the invention.

FIG. 8 is a plan view of the order picker according to FIG. 7.

FIG. 9 shows a further embodiment of the order picker according to the invention.

FIG. 10 is a sectional view along the line BB according to FIG. 9.

As shown in FIG. 1, an order picker 1 according to the invention comprises a vehicle 2, a robot device 3, a pick-up device 4 and a carrying device 5. The order picker 1 furthermore comprises a control unit (not shown), which may be arranged both on the vehicle 2 and separately from the vehicle and also in a divided manner, in other words both partially on the vehicle and outside the vehicle.

In the figure, the robot device 3 comprises an articulated arm 3a, which is equipped at its end axis 55 with a gripping device 6 and with an integrated 2D or 3D camera (not shown).

The pick-up device 4 for picking up a selection pallet is arranged at the front of the vehicle. In this case, the pick-up device 4 comprises a height-adjustable fork carriage 9 that can be pivoted about a vertical axis 10 and is intended for lifting a selection pallet. The fork carriage 9 is in a conventional form comprising two fork prongs 11.

In this case, the pick-up device 4 is transversely mounted on the vehicle 2 so as to be linearly movable by means of a guide device 12. As a result, selection pallets can be picked up in a self-supporting manner from both sides.

The carrying device 5 for carrying an order pallet is arranged on the opposing end of the vehicle 2.

The robot device 3, pick-up device 4 and carrying device 5 are all arranged on a lifting device 22 of the vehicle 2 in order to allow a height adjustment of the robot device 3, pick-up device 4 and carrying device 5. Thus, selection pallets can be picked up by the order picker 1 on the two sides of the vehicle and at different levels and can be picked.

FIG. 2 shows an order picker 1 similar to that shown in FIG. 1, except that the vehicle 25 is differently constructed. Said vehicle has no lifting device and is therefore only suitable for selection pallets deposited at floor level. For this purpose, two front drive wheels 7 are arranged relatively centrally and therefore in a load-carrying manner and two rear wheels 8 are designed as castors 8, so that there is a high degree of mobility combined with a high degree of stability.

FIG. 3 shows the order picker 1 from FIG. 1 in a picking aisle 19, viewed from above. The picking aisle 19 is limited on the two sides by a pallet rack 23 or a pallet row of deposited selection pallets 20, 21. In warehouses of this type, the selection pallets 20, 21 are generally loaded with the same load units 59 containing unmixed goods (FIG. 6).

As can be seen from this perspective, the carrying device 5 is also designed having two fork prongs 14 and arranged centrally between the wheel arms 13, which comprise the castors 8.

As shown by means of arrows indicating a circle, the fork carriage 9 of the pick-up device 4 may be pivoted about a vertical axis. Once the fork carriage 9 has been pivoted in a suitable manner and oriented with respect to height and in the vehicle longitudinal direction onto the selection pallet 21, the pick-up device 4 and therefore the fork carriage 9 can be displaced by the guide device 12 (not shown in the figure) laterally with respect to the vehicle 25 in such a way that the fork prongs 11 accordingly engage with the selection pallet 21. In this case, the displacement length L made possible by the guide device 12 is nearly as large as the width of the vehicle 25.

The fork carriage 9 is then slightly lifted, so the fork prongs 11 lift the selection pallet 21. The pick-up device 4 and therefore the fork carriage 9 are then moved back by means of the guide device 12 so the selection pallet 21 is positioned on the front side of the vehicle 25.

As can be seen in FIG. 4 on the partial section in the rear region of the vehicle 25, the carrying device 5 also comprises a height-adjustable fork carriage 15 comprising fork prongs 14, on which, as shown, an order pallet 16 can be stored.

At the same time, an empty selection pallet 17, in this case, can be mounted on the fork prongs 11 of the fork carriage 9 of the pick-up device 4 on the other side of the vehicle 25.

As shown in FIG. 5, the two pallets 16 and 17 are then placed by suitable height adjustment of the fork carriages 9 and 15 in such a way that the two pallets are located within the action region of the articulated arm 3a of the robot device 3. Thus, by means of the articulated arm 3a, load units 59 can be moved from one pallet to the other. In this case, movement of a load unit 59 from the selection pallet 17 to the order pallet 16 is preferred for picking. However, if order changes are made at short notice or in the case of incorrect loadings, a movement of load units 59 from the order pallet 16 back to the selection pallet 17 is also possible.

In this case, the fork carriage 9 and the fork carriage 15 may be adjusted in height to approximately the same extent, the lifted position being shown by dashed lines in the case of the fork carriage 15.

As can also be seen in FIG. 5, the articulated arm 3a can be configured as an articulated arm comprising a plurality of differently oriented rotational axes 50, 51, 52, 53, 54 and 55. As a result, a maximum mobility is ensured. With regard to the robot device 3 or the articulated arm 3a, the lifting function of the pick-up device 4 and of the carrying device 5 indicated by the arrows 56, 57 in interaction with the articulated arm can be regarded as further external robot axes or robot degrees of freedom of the robot device 3, which increase the reach.

In FIG. 6, the vehicle 25 is shown having the selection pallet 21 positioned for the picking process and the positioned order pallet 16. In this case, the maximum reach of the articulated arm 3a or the gripping device 6 is indicated thereon by the radii R_R and the associated semicircles.

As can be seen, it is not necessary for the reach of the articulated arm 3a to be sufficient to cover the pallets 20 positioned in the rack. Instead, it is completely sufficient if the selection pallet 21 and the order pallet 16 are within the working range defined by the radii R_R. Then, by means of the articulated arm 3a and the gripping device 6, picking can take place accordingly from the selection pallet 21 to the order pallet 16.

In this case, at the beginning of the picking process, a recording of the loading state of the selection pallet 21 is firstly made using the camera integrated in the gripping device 6. By means of a corresponding image evaluation, for example by means of the control unit, the position of the load unit 59 is determined so the path of the gripping device 6 and therefore the movement of the articulated arm for picking up the load unit 59 and the movement along the path, indicated by the arrow 60, onto the order pallet 16 can be determined, and so the load unit 59 is brought from the selection pallet 21 onto the order pallet 16 and deposited there at a precalculated position.

In this case, the order pallet 16 can also be additionally scanned by the camera before a process of this type in order to determine the suitable unloading position.

At least one recording of the selection pallet 21 is then in turn made using the camera integrated in the gripping device 6 in order to check that the contours are maintained. This is required since, owing to the removal of the load unit 59, other load units 59 or other elements of the selection pallet 21, such as, for example films, could have been displaced with respect to their position, and so a reintroduction of the selection pallet 21 into the rack 23 would be hindered.

It is to be noted here that, owing to the positioning of the camera on the gripping device, the entire external contour of the selection pallet 21 can be travelled along and therefore controlled, since the entire selection pallet 21 is located within the radius defined by R_R. This likewise applies and can be carried out in the same manner for the order pallet 16, with it being less critical to maintain a specific contour in the case of the order pallet 16, in particular because of the lateral stabilisation by the wheel arms 13, but this may be advantageous for the onward transportation of the order pallet 16 on a conveying device or on a lorry.

On conclusion of the control process, the selection pallet 21 can be returned to its site in the rack or the row 23 of selection pallets 20 using the pick-up device 4.

It is decisive here that, because of the mobility of the articulated arm 3a, the end axis 55 together with the gripping device 6 for the load unit 59 can always be moved within the vehicle width and therefore within the picking aisle 19. On the one hand, this leads to lower load torques for the robot unit 3 and to smaller tilting torques for the entire vehicle 25 and therefore to a lower inherent weight with regard to the stability bases of the vehicle 25. Furthermore, no increased width of the picking aisle 19 is required, so the order picker 1 according to the invention can be used, in particular, in already conventional and existing picking aisles 19.

It is also decisive here that, by bringing the selection pallet 21 in front of the vehicle 25, the free space determined by the picking aisle 19 above the selection pallet 21 can be directly used from above for the operation of the robot device 3 and in particular the recordings by the camera. On the other hand, no space is required for the movement of the gripping device 6 and the recordings of the camera above the selection pallets 21 in the racks or rows 23. Rather, only the extremely small space above the selection pallets 21 in the rows 23 is necessary, said space being required accordingly for lifting by the fork prongs 11.

It is furthermore advantageous that, owing to the close arrangement of the selection pallet 21 and order pallet 16 to one another, the path for the specific individual picking aisle is short and this can therefore be quick.

The variant of the order picker 1 from FIG. 2 that is shown in FIG. 7 is distinguished in that the fork prongs 42 of the pick-up device 41 are configured as fork arms 42, in which load rollers 40 are height-adjustably mounted approximately centrally. As a result, the load pick-up is supported by wheels, which in particular for the lateral load pick-up, provide advantages with regard to the stability and the required inherent weight of the vehicle. The lifting function of the load rollers 40 takes place in this case by means of steering gears, known, for example, from low-platform vehicles, in the fork arms and on the rotational axis 10.

In addition, the lifting function of the pick-up device 4 known from FIG. 2 may, however, also be provided here so, for example, transportation journeys or the rotation of the pick-up device 41 can take place about the rotational axis 10 without the load rollers 40 simultaneously folding down from the fork arms 42 and coming into contact with the floor.

The view of the order picker 1 from FIG. 7 that is shown in FIG. 8 illustrates from above the position of the load rollers 40 approximately in the centre of the fork arms 42. It can also clearly be seen from this figure that the fork arms 42 of the order picker 1 from FIG. 7, like the fork prongs 11 of the order pickers 1 from FIGS. 1 and 2, can only be rotated downwardly from the position shown in the figure for a change of side when the pick-up device 41 is displaced laterally along the horizontal arrow L, whereupon the fork arms can finally be rotated to the left to reach a selection pallet on the other side of the picking aisle 19. These two movements may also take place synchronously. In this case, the pick-up device 41 remains completely within the available width of the picking aisle 19 so the order picker 1 according to the invention can be used in conventional narrow picking aisles 19.

FIG. 9 is a side view of an order picker 1 according to the invention in the configuration comprising a storage and retrieval unit 30 as a vehicle or carrier vehicle. The storage and retrieval unit 30 guided on floor and ceiling rails 32, 34 is configured here, for example, by a plurality of posts 31, in particular two posts 31, the robot device 3, pick-up device 4 and carrying device 5 also being arranged on the vehicle or storage and retrieval unit 30, as in the other embodiments.

In this embodiment, a pivoting of the forks 33 of the pick-up device 4 is dispensed with. Instead, the forks 33 are oriented directly to the sides of the storage and retrieval unit 30 and are configured as telescopic forks 33. In this case, the telescopic forks 33 can be telescoped in particular in the two directions to the side of the storage and retrieval unit 30. As a result, selection pallets 21 can be picked up from the two sides.

Given the fact that, in the storage and retrieval unit 30 guided on floor and ceiling rails 32, 34, unloading or offloading stations are frequently accordingly arranged to the side of the rails, the carrying device 5 can be designed identically to the pick-up device 4 having telescopic forks 33. However, these may also only be able to be telescoped on one side in accordance with the position of the unloading station.

The storage and retrieval unit 30 is otherwise configured in a conventional form, in other words having corresponding running gears 26, 27 for the rails 32, 34 and a lifting device, which can accordingly lift and lower the robot device 3, pick-up device 4 and carrying device 5 mounted on a carrying plate along the direction of the arrow 58 to various rack heights.

The sectional view shown in FIG. 10 along the line BB according to FIG. 9 shows the order picker according to the invention in the configuration having a storage and retrieval unit 30 in a picking aisle 19, which is formed by two rows of high racks 23 comprising selection pallets 20, 21. These are generally loaded with load units 59 containing unmixed goods. However, it should be pointed out at this point that all the order pickers 1 according to the invention can also be used in selection pallets 21, 22 not loaded with unmixed goods since, in particular, using the camera, the types of load units 59 can also be distinguished accordingly and can therefore be selected during the picking process.

The storage and retrieval unit 30 travels as a carrier vehicle along the guide rails 32, 34. For the picking process, the storage and retrieval unit 30 is positioned in such a way that, by extending the telescopic forks 33, the engagement with a selection pallet 21 can take place. This is illustrated in the figure by the dashed extension path L2. As soon as the telescopic forks 33 are extended, the selection pallet 21 is lifted upwardly by a slight lifting movement along the arrow 58 and the telescopic forks 33 are retracted again.

The remainder of the picking process can then take place as described in the other embodiments.

The order pallet 16 can also be picked up and deposited in the same manner.

It should be pointed out that, with an identical structure of the pick-up device 4 and carrying device 5, the selection pallet 21 and order pallet 16 can also be positioned accordingly in the reverse manner to that shown in the figure.

Likewise, the order picker according to the invention may also have a plurality of articulated arms 3a, a plurality of pick-up devices 4 and a plurality of fork prong pairs 11, 33 and/or a plurality of carrying devices 5 and pairs of fork prongs 14, so a plurality of selection pallets 21 and/or order pallets 16 can be picked simultaneously and/or in quick succession or alternately. A configuration of this type is conceivable in particular in the case of storage and retrieval units 30 in high-rack warehouses, of the type in which the picking aisles 19 are wider than a pallet due to the design thereof.

The invention claimed is:
1. An order picker (1) comprising:
a vehicle (2, 25, 30);

a robot device (3) on the vehicle (2, 25, 30), which is configured to manipulate objects within a working range (R_R);
a pick-up device (4, 41) on the vehicle for picking up a selection pallet (20, 21) within the working range (R_R);
a carrying device (5) on the vehicle for carrying an order pallet (16) within the working range (R_R);
a control unit configured to activate the robot device (3) to convey load units (59) from the selection pallet (20, 21) positioned on the pick-up device (4,41) in the working range (R_R) onto the order pallet (16) carried on the carrying device (5) in the working range (R_R); and
at least one camera;
wherein the control unit is configured to control the conveying of load units (59) using recordings, produced by the at least one camera, of the order pallet (16) carried by the carrying device (5) and the selection pallet (20, 21) picked up by the pick-up device (4, 41), and wherein the at least one camera is arranged such that each camera is configured to record the positions of the load units (59) on the carried order pallet (16) and/or the contour of the carried order pallet (16).

2. The order picker (1) according to claim 1, wherein the pick-up device (4, 41) is configured to remove a selection pallet (20, 21) from a rack (23), rack warehouse or a warehouse region.

3. The order picker (1) according to claim 1, wherein the robot device (3) is configured such that when conveying a load unit (59) from a selection pallet (20, 21) that has been picked up to the order pallet (16), the load unit (59) and parts of the robot device (3) that move during the conveyance are kept within a width of the vehicle (2, 25, 30).

4. The order picker (1) according to claim 1, wherein the robot device (3) is configured such that when conveying a load unit (59) from a selection pallet (20, 21) that has been picked up to the order pallet (16), the load unit (59) and parts of the robot device (3) that move during the conveyance are moved above the vehicle (2, 25), the selection pallet (21) that has been picked up, and the carried order pallet.

5. The order picker (1) according to claim 1, wherein the robot device (3) comprises an articulated arm (3a).

6. The order picker (1) according to claim 1, wherein the control unit is configured to activate the vehicle (2, 25, 30) such that the vehicle (2, 25, 30) approaches one or more selection pallets (20, 21) according to a list of load units (59) to be picked.

7. The order picker (1) according to claim 1, wherein the control unit is configured to activate the pick-up device (4, 41) to pick up the selection pallet (20, 21) and/or to activate the carrying device (5) to pick up and/or carry an order pallet (16).

8. The order picker (1) according to claim 1, wherein the order picker (1) furthermore comprises a guide device (12), on which the pick-up device (4, 41) is mounted so as to be linearly movable transversely to the vehicle (2, 25).

9. The order picker (1) according to claim 1, wherein the pick-up device (4, 41) comprises a height-adjustable fork carriage (9) that can be pivoted about a vertical axis (10) and is intended for lifting a selection pallet (21), wherein the fork carriage (9) comprises load rollers (40) for wheel support for the fork carriage (9), and the carrying device (5) comprises a height-adjustable fork carriage (15) for lifting an order pallet (16), wherein the fork carriage (15) comprises load rollers (40) for wheel support for the fork carriage (15);
wherein the pick-up device (4, 41) and the carrying device (5) are arranged on opposing ends of the vehicle (2, 25, 30).

10. The order picker (1) according to claim 1, wherein the pick-up device (4) and/or the carrying device (5) comprise telescopic forks (33), which are configured to be telescoped transversely to the vehicle (30) and on both sides thereof.

11. The order picker (1) according to claim 1, wherein the vehicle (30) is a storage and retrieval unit (30) for use in a high-rack warehouse.

12. The order picker (1) according to claim 1, wherein the pick-up device (4, 41) and the carrying device (5) are arranged on opposing ends of the vehicle (2, 25, 30).

13. The order picker (1) according to claim 1, wherein the control unit is configured to determine, before and after the conveying of a load unit (59) and using recordings produced by the at least one camera, whether, in addition to the conveyed load unit (59), other load units (59) on the carried order pallet (16) have changed their position and/or whether a contour of the order pallet (16) satisfies predetermined parameters.

14. The order picker (1) according to claim 13, wherein the control unit is configured to determine, before and after the conveying of the load unit (59) and using recordings produced by the at least one camera, whether, in addition to the conveyed load unit (59), other load units (59) that have been picked up and disposed on the selection pallet (20, 21) have changed their position and/or whether the contour of the selection pallet (20, 21) satisfies predetermined parameters.

15. The order picker (1) according to claim 1, wherein the vehicle (25) is a narrow aisle vehicle (25) for use in a pallet warehouse.

16. The order picker (1) according to claim 15, wherein the carrying device (5) is arranged between two wheel arms (13) of the vehicle (25), in which rollers (8) are mounted.

17. The order picker (1) according to claim 1, wherein the vehicle (2, 30) comprises a lifting device (22) for the height adjustment of the robot device (3), pick-up device (4, 41) and/or carrying device (5).

18. The order picker (1) according to claim 17, wherein drive wheels (7) are arranged closer to the pick-up device (4, 41) than to the carrying device (5).

19. A method for order picking an order pallet (16) comprising load units (59) from a goods warehouse having selection pallets (20, 21) arranged in rows and/or racks (23) using the order picker (1) according to claim 1, said method comprising the steps of:
a) arranging the order pallet (16) on the vehicle (2, 25, 30) within the working range (R_R) of the robot device (3);
b) moving the vehicle (2, 25, 30) to reach a position next to a current selection pallet (20, 21) comprising at least one load unit (59) currently required for picking;
c) positioning the selection pallet (20, 21) within the working range (R_R) of the robot device (3), so that there is adequate space above the current selection pallet (20, 21) to operate the robot device (3);
d) conveying the at least one load unit (59) currently required for picking from the selection pallet (20, 21) onto the order pallet (16) using the robot device (3) and continuing with step d) until all the required load units (59) have been removed from the current selection pallet (20, 21);
e) detecting the position of the load units (59) located on the order pallet (16) and/or the contour of the order pallet (16) using images recorded by a camera, wherein the position of the load units (59) located on the selection pallet (20, 21) and/or the contour of the selection pallet (20, 21) is detected using images recorded by the camera;

f) returning the current selection pallet (20, 21) to the previous warehouse position; and g) if the picking has not yet been completed, continuing with step b), otherwise moving the vehicle (2, 25, 30) to an order pallet transfer point/unloading point and transferring or unloading the order pallet (16).

20. The method for order picking according to claim 19, wherein, after step c) and before step d), the following step is carried out:

c1) detecting the position of the load units (59) located on the order pallet (16) and/or the contour of the order pallet (16) by using images recorded by the camera; wherein step d) is continued with either step c1) or step c2): detecting the position of the at least one load unit (59) currently required for picking and/or the contour of the selection pallet (20, 21) using images recorded by the camera; followed by step c1).

21. The method for order picking according to claim 19, wherein the detected positions and/or contours are compared with permitted limit values and, on deviation, a disturbance and/or alarm function is triggered.

* * * * *